（12）United States Patent
Rapaka et al.

(10) Patent No.: US 12,064,852 B2
(45) Date of Patent: Aug. 20, 2024

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Srikanth Rapaka, Natick, MA (US); Nilanjan Sarangi, Shrewsbury, MA (US); Roger P. Zaleski, North Grafton, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 18/183,280

(22) Filed: Mar. 14, 2023

(65) Prior Publication Data

US 2023/0271302 A1    Aug. 31, 2023

Related U.S. Application Data

(63) Continuation of application No. 16/457,462, filed on Jun. 28, 2019, now abandoned.
(Continued)

(51) Int. Cl.
*B24D 3/04*        (2006.01)
*B24D 3/10*        (2006.01)
(Continued)

(52) U.S. Cl.
CPC .................. *B24D 3/04* (2013.01); *B24D 3/10* (2013.01); *B24D 3/18* (2013.01); *B24D 18/00* (2013.01); *C09K 3/1436* (2013.01)

(58) Field of Classification Search
CPC ... B24D 3/14; B24D 3/04; B24D 3/10; B24D 3/18; B24D 18/00; B24D 5/06; B24D 5/14; B24D 5/02; C09K 3/1436
See application file for complete search history.

(56) References Cited

U.S. PATENT DOCUMENTS 3,252,775 A    5/1966    Tocci-Guilbert
3,377,411 A    4/1968    Charvat
(Continued)

FOREIGN PATENT DOCUMENTS

CN    1072423 A    5/1993
CN    103781595 A    5/2014
(Continued)

OTHER PUBLICATIONS

International Search Report for PCT/US2019/039966 dated Oct. 23, 2019, 3 pages.
(Continued)

*Primary Examiner* — Pegah Parvini
(74) *Attorney, Agent, or Firm* — Abel Schillinger, LLP; Arpan Ghosh

(57) ABSTRACT

An abrasive article including a bonded abrasive having a body of a diameter of at least 260 mm and a volume of at least 20 cubic centimeters, the body also having a bond material including an inorganic material, abrasive particles having an abrasive particle size of at least 40 microns contained in the bond material, and a certain Homogeneity Factor.

20 Claims, 5 Drawing Sheets

Related U.S. Application Data

(60) Provisional application No. 62/692,309, filed on Jun. 29, 2018.

(51) Int. Cl.
*B24D 3/18* (2006.01)
*B24D 18/00* (2006.01)
*C09K 3/14* (2006.01)

(56) References Cited

U.S. PATENT DOCUMENTS

| | | | |
|---|---|---|---|
| 4,574,063 A | 3/1986 | Scherer | |
| 4,938,784 A | 7/1990 | Murakami et al. | |
| 5,203,882 A | 4/1993 | Carman et al. | |
| 5,221,294 A | 6/1993 | Carman et al. | |
| 5,273,558 A | 12/1993 | Nelson et al. | |
| 5,306,319 A * | 4/1994 | Krishnan | C08G 59/5026 51/293 |
| 5,536,282 A | 7/1996 | Yoon et al. | |
| 6,375,692 B1 * | 4/2002 | Manwiller | B24D 18/00 51/296 |
| 7,481,855 B2 | 1/2009 | Rogers et al. | |
| 8,129,300 B2 | 3/2012 | His et al. | |
| 10,449,656 B2 | 10/2019 | Ozaki et al. | |
| 2003/0194947 A1 | 10/2003 | Bright et al. | |
| 2008/0085660 A1 | 4/2008 | Orlhac | |
| 2009/0311946 A1 * | 12/2009 | Jeevanantham | B24D 3/32 51/296 |
| 2010/0154315 A1 * | 6/2010 | Wu | B24D 18/00 51/296 |
| 2013/0143476 A1 | 6/2013 | Liu et al. | |
| 2014/0287658 A1 * | 9/2014 | Flaschberger | C09K 3/1409 451/28 |
| 2014/0290149 A1 | 10/2014 | Vedantham et al. | |
| 2015/0267097 A1 * | 9/2015 | Rosenflanz | C09K 3/1409 451/28 |
| 2016/0151886 A1 | 6/2016 | Sarangi et al. | |
| 2017/0008153 A1 | 1/2017 | Sivasubramanian et al. | |
| 2017/0203406 A1 * | 7/2017 | Ganapathiappan | B24B 37/22 |
| 2020/0001429 A1 | 1/2020 | Rapaka et al. | |
| 2021/0362298 A1 | 11/2021 | Ogasawara et al. | |

FOREIGN PATENT DOCUMENTS

| | | |
|---|---|---|
| CN | 106145946 A | 11/2016 |
| EP | 1329439 A1 | 7/2003 |
| JP | H09267263 A | 10/1997 |
| JP | H10277951 A | 10/1998 |
| JP | 2004331736 A | 11/2004 |
| JP | 2006224302 A | 8/2006 |
| JP | 4331736 B2 | 9/2009 |
| JP | 2014083621 A | 5/2014 |
| JP | 2014525355 A | 9/2014 |
| WO | 9001397 A1 | 2/1990 |
| WO | 0108848 A1 | 8/2001 |
| WO | 02016286 A1 | 2/2002 |
| WO | 2012031251 A2 | 3/2012 |
| WO | 2014192837 A1 | 12/2014 |
| WO | 2017200833 A1 | 11/2017 |
| WO | 2019193887 A1 | 10/2019 |
| WO | 2020006491 A1 | 1/2020 |
| WO | 2020006502 A1 | 1/2020 |

OTHER PUBLICATIONS

International Search Report for PCT/US2019/039946 dated Oct. 24, 2019, 3 pages.

Cholewa et al., "Technological aspects of particle-reinforced composites production", Materials & Design, vol. 18, Issues 4-6, pp. 401-405, Dec. 1, 1997.

* cited by examiner

ABRASIVE ARTICLES AND METHODS FOR FORMING SAME

CROSS-REFERENCE TO RELATED APPLICATION(S)

This application is a continuation of and claims priority under 35 U.S.C. § 120 to U.S. patent application Ser. No. 16/457,462 entitled "ABRASIVE ARTICLES AND METHODS FOR FORMING SAME," by Srikanth RAPAKA et al., filed Jun. 28, 2019, which claims priority under 35 U.S.C. § 119(e) to U.S. Provisional Application No. 62/692,309, filed Jun. 29, 2018, entitled "ABRASIVE ARTICLES AND METHODS FOR FORMING SAME," by Srikanth RAPAKA et al., all of which are assigned to the current assignee hereof and incorporated herein by reference in their entireties for all purposes.

BACKGROUND OF THE INVENTION

Field of the Disclosure

The present invention relates in general to abrasive articles, and in particular, to bonded abrasive articles having a particular homogeneity.

Description of the Related Art

Abrasive articles used in machining applications typically include bonded abrasive articles and coated abrasive articles. A bonded abrasive article generally has a bond matrix containing abrasive particles. Bonded abrasive articles can be mounted onto a suitable machining apparatus and used in various applications, such as shaping, grinding, polishing, and cutting. The industry continues to demand improved abrasive tools to meet needs of gear grinding.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to bonded abrasive articles suitable for use in material removal operations. The bonded abrasive articles can be used in various applications, including for example, surface grinding, precision grinding operations (e.g., gear grinding operations), and the like. In one particular aspect, the abrasive article may include a bonded abrasive of a certain dimension and structure that has improved performance in foundry applications.

Reference herein to bonded abrasive articles includes reference to a three dimensional volume of an abrasive material having abrasive particles contained within a volume of a bond material. Bonded abrasive articles can be distinct from coated abrasive articles that may utilize a single layer of abrasive particles contained in a layer of bond or adhesive material. Moreover, the bonded abrasive articles of embodiments herein may include some porosity within the three-dimensional volume of a bond material.

Figure 1:
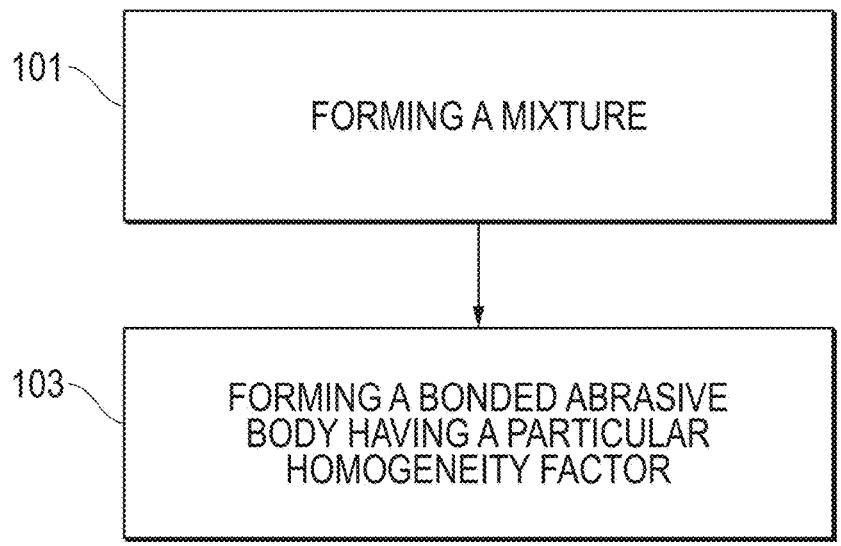
FIG. 1 includes a flow chart including a process for forming an abrasive article according to an embodiment.

FIG. 1 includes a flowchart for forming an abrasive article in accordance with an embodiment. As illustrated the process for forming the abrasive article can begin at step 101 by forming a mixture. The mixture can be a slurry including a plurality of components homogeneously mixed in therein. In accordance with an embodiment, the process of forming the mixture can include providing a carrier material. A carrier material may be a liquid suitable for containing solid components therein. For example, in one particular embodiment, the carrier can include water, more particularly, may consist essentially of water such as deionized water.

The process of forming the mixture may further include adding a bond precursor material to the carrier. A bond precursor material may be a material that becomes the bond material of the final-formed abrasive article. In accordance with an embodiment, the bond precursor material can include a powder material configured to form the bond material of the final-formed abrasive article. In one embodiment, the bond precursor material can include an inorganic material, such as, but not limited to, metals, metal alloys, ceramics, vitreous materials or frit materials, or any combination thereof. The bond precursor material may include inorganic material in an amorphous phase, polycrystalline phase, monocrystalline phase, or any combination thereof.

In accordance with one embodiment, the bond precursor material may be added in a particular content. For example, mixture may include at least 1 wt % of the bond precursor material for a total weight of the mixture, such as at least 2 wt % or at least 3 wt % or at least 4 wt % or at least 5 wt % or at least 6 wt % or at least 7 wt % or at least 8 wt % or at least 9 wt % or at least 10 wt % or at least 12 wt % or at least 14 wt % or at least 16 wt % or at least 18 wt % or at least 20 wt % or at least 22 wt % or at least 24 wt % or at least 26 wt % or at least 28 wt % or at least 30 wt %. Still, in one non-limiting embodiment, the mixture may include not greater than 30 wt % of the bond precursor material for a total weight of the mixture, such as not greater than 28 wt % or not greater than 25 wt % or not greater than 22 wt % or not greater than 20 wt % or not greater than 18 wt % or not greater than 15 wt % or not greater than 12 wt % or not greater than 10 wt % or not greater than 8 wt % or not greater than 5 wt % or not greater than 3 wt %. The mixture may include a content of the bond precursor material in an amount within a range including any of the minimum and maximum percentages noted above.

In accordance with another embodiment, the process of forming mixture can include adding a gelling agent to the mixture. The addition of the gelling agent to the mixture may be completed at various times, including for example, prior to the addition of any dry components. The gelling agent may be a material that facilitates changing the mixture into a gel. A gelling agent may be used in combination with gelling processes, including for example, the addition of heat, to facilitate the gelation process.

In accordance with an embodiment the gelling agent may be an organic material, such as a gum. For example, the gelling agent may be selected from the group consisting of agar, agarose, xanthan gum, carboxy methyl cellulose, gellan gum, carrageenan gum, guar gum, tara gum, cellulose gum, locust bean gum, pectin, or any combination thereof. According to one particular embodiment, the gelling agent may be preferably a gellan gum. According to another particular embodiment, the gelling agent may include pectin or a combination of pectin and at least one other gelling agent noted in embodiments herein.

For certain embodiments, the mixture may include a certain content of the gelling agent to facilitate the formation of an improved abrasive article. For example the mixture may include at least 0.1 wt % of the gelling agent for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt %. In one non-limiting examples, the mixture may include not greater than 10 wt % of the gelling agent for a total weight of the mixture, such as not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt %. The mixture may include a content of the gelling agent in an amount within a range including any of the minimum and maximum percentages noted above.

The mixture may further include abrasive particles configured to form the abrasive component of the final-formed abrasive article. The abrasive particles may be added to the mixture at various times, including for example, after the addition of the bond precursor material to the mixture. Still, it will be appreciated, in other embodiments, the abrasive particles may be added in combination with one or more of the other components in the mixture, including for example, but not limited to the gelling agent, the bond precursor material, or one or more additives. The abrasive particles may include a material such as from the group consisting of oxides, borides, nitrides, carbides, oxynitrides, oxycarbides, amorphous, monocrystalline, polycrystalline, superabrasive or any combination thereof. In one particular embodiment, the abrasive particles can include alumina, and may consist essentially of alumina.

The mixture may include a certain content of abrasive particles to facilitate suitable manufacturing and/or improved performance of the abrasive article. For example, in one embodiment, the mixture may include at least 20 wt % of the abrasive particles for a total weight of the mixture, such as at least 22 wt % or at least 24 wt % or at least 26 wt % or at least 28 wt % or at least 30 wt % or at least 35 wt % or at least 40 wt % or at least 45 wt % or at least 50 wt % or at least 55 wt % or at least 60 wt % or at least 65 wt % or at least 70 wt %. In another non-limiting embodiment, the mixture may include not greater than 80 wt % of the abrasive particles for a total weight of the mixture, such as not greater than 75 wt % or not greater than 70 wt % or not greater than 65 wt % or not greater than 60 wt % or not greater than 55 wt % or not greater than 50 wt % or not greater than 45 wt % or not greater than 40 wt % or not greater than 35 wt % or not greater than 30 wt %, such as not greater than 25 wt %. The mixture may include a content of the abrasive particles in an amount within a range including any of the minimum and maximum percentages noted above.

The mixture may further include one or more additives which may facilitate improved manufacturing and/or performance of the abrasive article. Some exemplary additives may include, but not limited to, dispersants, surfactants, cationic agents, or any combination thereof. As used herein, a dispersant may prevent flocculation of the mixture by electrostatic or steric repulsion. As used herein, a surfactant may lower the surface tension between two liquids, a solid and liquid or a gas and liquid. As used herein a cationic agent may be an ionic compound (e.g., a salt) that cross-links with the gelling agent, which may be an anionic material.

The one or more additives may be added to the mixture at various times, including for example, after the addition of the solid components to the mixture, including for example, the bond precursor material and the abrasive particles. Still, it will be appreciated, in other embodiments, the one or more additives may be added in combination with one or more of the other components in the mixture, including for example, but not limited to the gelling agent, the bond precursor material, or one or more additives. The order the additives are added may also be significant to facilitate suitable formation of the abrasive article. For example, in at least one embodiment, the cationic agent may be added after any other additives are added to the mixture.

The dispersant can include at least one of sodium polyacrylate (e.g., Darvan 811), copolymer with pigment affinic group (e.g., BYK192), ammonium polymeta acrylate (e.g., Darvan C-N), ammonium polyacrylate (e.g., Darvan 821A), polyacrylic acid, ammonium salt in an acrylic polymer in water (e.g., Dispex), citric acid, sodium dodecylbenzenesulfonate, cetyltrimethyl ammonium bromide or any combination thereof.

The mixture may include a particular content of dispersant to facilitate improved manufacturing and/or performance of the abrasive article. For example, the mixture can include at least 0.1 wt % of the dispersant for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the dispersant for a total weight of the mixture, such as not greater than 5 wt % or not greater than 4 wt % or not greater than 3 wt % or not greater than 2 wt % or not greater than 1 wt %. The mixture may include a content of the dispersant in an amount within a range including any of the minimum and maximum percentages noted above.

Suitable examples of surfactants can include inorganic materials, organic materials or a combination thereof. A suitable surfactant may include a sulfate, a sarconsinate, a laurate, a stearate, lecithin, and the like. In one particular embodiment, the surfactant can include sodium lauroyl sarcosinate, sodium laurel sulfate, sodium laurate, sodium stearate, sodium alkyl sulfate, sodium dodecyl sulfate, sorbitan, polyethylene glycol, polysorbate, glycerol monosterate, egg lecithin or any combination thereof.

The mixture may include a particular content of surfactant that may facilitate improved manufacturing and/or performance of the abrasive article. For example, the mixture can include at least 0.1 wt % of the surfactant for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the surfactant for a total weight of the mixture, such as not greater than 5 wt % or not greater than 4 wt % or not greater than 3 wt % or not greater than 2 wt % or not greater than 1 wt %. The mixture may include a content of the surfactant in an amount within a range including any of the minimum and maximum percentages noted above.

Some suitable examples of cationic agents can include inorganic compounds, particularly salts, such as sulfates, chlorides, chromates, nitrates, carbonates (e.g., bicarbonates), hydrates, and the like. In particular instances, the cationic agent may include a compound including an alkali element, alkali earth element, transition metal element, hydrogen, or a combination thereof. More particularly, the cationic agent may include a compound including sodium, potassium, lithium, ammonium, copper, magnesium, iron, calcium, or any combination thereof. In one particular embodiment, the cationic agent is preferably calcium chloride or sodium chloride. For example, the cationic agent may consist of calcium chloride or sodium chloride.

The cationic agent may be added to the mixture at various times, including for example, after the addition of the solid components (e.g., abrasive particles, one or more fillers, bond precursor mixture) to the mixture. In one particular embodiment, the cationic agent may be the last component added to the slurry prior to gelation. Still, it will be appreciated, in other embodiments, the cationic agent may be added in combination with one or more of the other components in the mixture, including for example, but not limited to the gelling agent, the bond precursor material, abrasive particles or one or more additives.

The mixture may include a particular content of cationic agent that may facilitate improved manufacturing and/or performance of the abrasive article. For example, the mixture can include at least 0.1 wt % of the cationic agent for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the cationic agent for a total weight of the mixture, such as not greater than 5 wt % or not greater than 4 wt % or not greater than 3 wt % or not greater than 2 wt % or not greater than 1 wt %. The mixture may include a content of the cationic agent in an amount within a range including any of the minimum and maximum percentages noted above.

The method of forming mixture may include continuous mixing while the one or more components are added. In particular, mixing may continue throughout the process of adding the components. In certain instances, the components may be added in a particular order, for example the gelling agent may be added first, followed by the addition of the bond precursor material and abrasive particles. One or more of the additives such as the dispersant, surfactant and cationic age may be added before or after the addition of the bond precursor material and/or abrasive particles. In a particular embodiment, the cationic agent can be added last of all the components. In another embodiment, a mixer may be used to aid mixing, such as a shear mixer, a ball mill, or any combination thereof. In an aspect, a shear mixer can be a high-shear mixer, or a low-shear mixer. In a particular aspect, to aid mixing, a shear rate may be at least 500 $S^{-1}$, at least 700 $S^{-1}$, at least 800 $S^{-1}$, or at least 900 $S^{-1}$. In another particular aspect, a shear rate may be at most 1200 $S^{-1}$, at most 1100 $S^{-1}$, or at most 1000 $S^{-1}$. It is to be understood, the shear rate can be within a range including any of the minimum and maximum values noted herein. For example, a suitable shear rate can be from 500 $S^{-1}$ to 1200 $S^{-1}$.

In at least one embodiment, the method of making the abrasive article includes changing the mixture to a gel. The gelling of the mixture can be facilitated by the addition of one or more of the components, including for example, the gelling agent and/or one or more additives. In accordance with one particular embodiment, the process of forming mixture into a gel can include forming a mixture first including the gel and the carrier, such as water. After forming the mixture including the gel and water, the process may continue by adding at least one of a bond precursor material, abrasive particles, and one or more additives, or any combination thereof. After adding the bond precursor material, abrasive particles, and/or one or more additives to the mixture, the process can continue by adding the cationic agent to the mixture. In particular instances, the cationic agent may be added in the final step of forming the mixture prior to forming the mixture into a gel.

The process of forming the gel can include hydrating the gel. In a particular embodiment, the process of forming the gel can be a process of hydrating the gel. In particular, the process of forming the gel can include heating the mixture to a gelling temperature. More particularly, the mixture can be mixed while heating the mixture to the gelling temperature. In at least one embodiment, the gelling temperature can be at least 50° C., such as at least 60° C. or at least 70° C. or at least 80° C. or at least 90° C. or at least 100° C. Still, in one non-limiting embodiment, the gelling temperature may be not greater than 100° C., such as not greater than 90° C. or not greater than 80° C. or not greater than 70° C. It will be appreciated that the gelling temperature can be within a range including any of the minimum and maximum temperatures noted above.

After forming the gel, which may also be referred to herein as a foamed gel, the process can continue by forming a green body from the gel. In accordance with an embodiment, the process of forming the green body can include at least one process from the group of pressing, molding, casting, drying, freezing, cooling or any combination thereof. In one particular embodiment, the process of forming the green body can include casting. Casting can be completed by pouring the gel into a production tool or cast of a suitable shape and size. During the process of forming the green body, some of the gel may still be forming. That is, gelation need not necessarily be completed during the forming of the green body. Still, in certain instances it may be desirable that the mixture is entirely gelled prior to the process of forming the green body. As used herein, reference to a gel includes a solid self-supporting structure that includes water contained in an integrated network defined by the solid particles in the gel. The gel may have a particular yield stress, such that it is self-supportive. For example, the gel can have a yield stress of at least 30 Pa, such as at least 60 Pa or at least 130 Pa.

In particular implementations, the process of forming the green body can include de-airing during the forming of the green body. For example, de-airing may be conducted during molding to remove bubbles.

After the green body has been formed, further processes may be conducted on the green body to change or convert the green body into a bonded abrasive body. After completing step 101, the process may continue at step 103 by forming a bonded abrasive body having a certain Homogeneity Factor. For example, one or more processes for converting the green body into the final-formed bonded abrasive body can include drying, sintering, cooling, pressing, vitrifying, or any combination thereof. In one particular embodiment, the process can include casting, cooling, drying and firing. In the context of a vitrified bond material, the firing conditions can be suitable for forming a vitreous bond material. For example, the firing temperature can be at least 800° C. or at least 900° C. or at least 1000° C. or at least 1100° C. or at least 1200° C. Still, in one embodiment, the firing temperature can be not greater than 1400° C. or not greater than 1300° C. or not greater than 1200° C. or not greater than 1100° C. or not greater than 1000° C. or not greater than 900° C.

The final-formed abrasive article may be a bonded abrasive body defining an interconnected network of bond material that contains abrasive particles in the three-dimensional volume (i.e., matrix) of the bond material. Furthermore, the bonded abrasive body may have an amount of porosity distributed throughout the body and defining a phase that is distinct from the phases of the bond material and abrasive particles.

Bonded abrasive bodies formed by the processes of the embodiments herein may have particular features. For example, the bonded abrasive bodies may have relatively larger dimensions compared to most conventional bonded abrasive bodies and may further have relatively larger abrasive grit contained therein, which may be particularly suited for use in large-scale cutting and grinding operations, such as the foundry industry.

Figure 2:
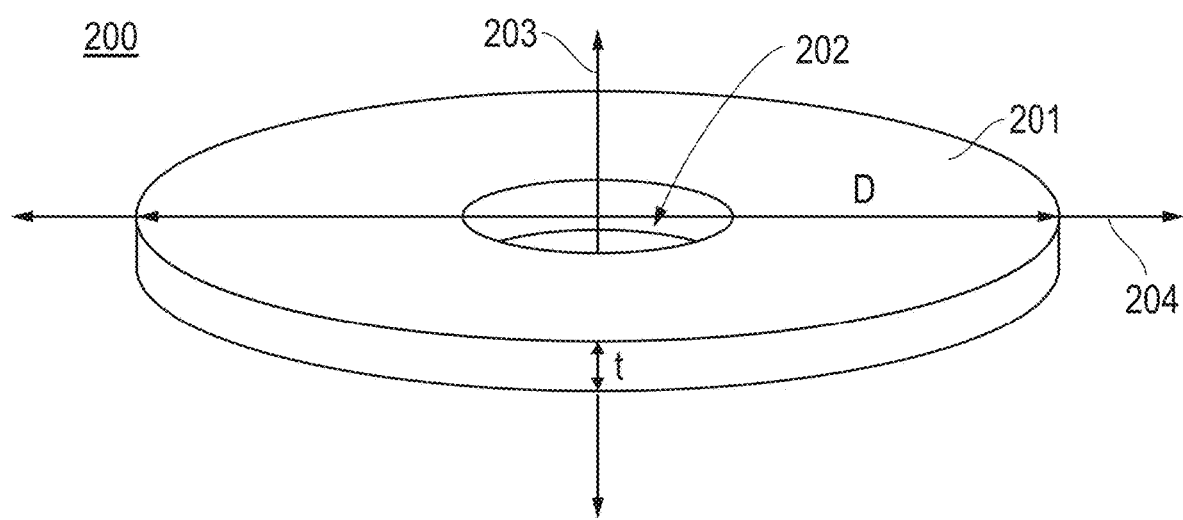
FIG. 2 includes a perspective-view illustration of an abrasive article according to an embodiment.

FIG. 2 includes a perspective view image of a bonded abrasive body in accordance with an embodiment. The abrasive article 200 can include a bonded abrasive body 201. The bonded abrasive body 201 can include an arbor hole 202 configured to engage with a spindle of a grinding machine for rotation of the abrasive article 200 relative to a workpiece. As further illustrated in FIG. 2, the bonded abrasive body includes an axial axis 203 defining an axial direction and a lateral axis 204 defining an axis in a radial direction. The axial axis 203 extends in the vertical direction as defined by a thickness (t) of the bonded abrasive body 201. The lateral axis 204 extends in a radial direction defining the radius or diameter (D) of the bonded abrasive body 201.

According to one embodiment, the bonded abrasive body may have a diameter (D) of at least 260 mm, such as a diameter of at least 270 mm or at least 280 mm or at least 290 mm or at least 300 mm or at least 325 mm or at least 350 mm or at least 375 mm or at least 400 mm or at least 425 mm or at least 450 mm or at least 475 mm or at least 500 mm or at least 525 mm or at least 550 mm or at least 575 mm. Still, in one non-limiting embodiment, the bonded abrasive body may have a diameter (D) of not greater than 800 mm or not greater than 700 mm or not greater than 600 mm or not greater than 575 mm or not greater than 550 mm or not greater than 525 mm or not greater than 500 mm or not greater than 475 mm or not greater than 450 mm or not greater than 425 mm or not greater than 400 mm or not greater than 375 mm or not greater than 350 mm or not greater than 325 mm or not greater than 300 mm or not greater than 290 mm or not greater than 280 mm. It will be appreciated that the diameter (D) can be within a range including any of the minimum and maximum values noted above. Reference herein to a diameter may be an average diameter of the bonded abrasive body, which is averaged from multiple measurements.

In another embodiment, the bonded abrasive body 201 may have a particular volume depending upon the application. For example, the volume of the bonded abrasive body 201 can be at least 1 cm$^3$. In other instances, the volume of the bonded abrasive body 201 can be at least 10 cm$^3$ or at least 20 cm$^3$ or at least 30 cm$^3$ or at least 50 cm$^3$ or at least 75 cm$^3$ or at least 100 cm$^3$. Still, in another non-limiting embodiment, the body may have a volume of not greater than 1000 cm$^3$ or not greater than 900 cm$^3$ or not greater than 800 cm$^3$ or not greater than 700 cm$^3$ or not greater than 600 cm$^3$ or not greater than 500 cm$^3$. It will be appreciated that the volume of the bonded abrasive body can be within a range including any of the minimum and maximum values noted above, such as a volume of at least 10 cm$^3$ to not greater than 1000 cm$^3$.

In still another embodiment, the bonded abrasive body 201 may have a particular thickness (t) configured for use in certain applications. For example, the bonded abrasive body 201 can have a thickness the body comprises a thickness of at least 2 mm, such as at least 3 mm or at least 4 mm or at least 5 mm or at least 10 mm or at least 15 mm or at least 20 mm or at least 30 mm or at least 50 mm or at least 100 mm or at least 200 mm or at least 300 mm. Still, in another embodiment, the thickness (t) of the bonded abrasive body 201 can be not greater than 500 mm, such as not greater than 400 mm or at least 300 mm or not greater than 200 mm or not greater than 100 mm or not greater than 80 mm or not greater than 60 mm or not greater than 40 mm or not greater than 20 mm or not greater than 10 mm. It will be appreciated that the thickness (t) of the bonded abrasive body 201 can be within a range including any of the minimum and maximum values noted above, such as a volume of at least 2 mm to not greater than 400 mm. Reference herein to a thickness may be an average thickness of the bonded abrasive body, which is averaged from multiple measurements.

The bonded abrasive body 201 may have a particular aspect ratio (D:t) of at least 5:1, such as at least 10:1 or at least 20:1 or at least 40:1 or at least 50:1 or at least 100:1 or at least 150:1 or at least 300:1 or at least 500:1 or at least 800:1 or at least 1000:1. Still, in another non-limiting embodiment, the aspect ratio (D:t) may be not greater than 100,000:1 or not greater than 10,000:1 or not greater than 1000:1 or not greater than 500:1. It will be appreciated that the aspect ratio can be within a range including any of the minimum to maximum ratios noted above.

The bonded abrasive body 201 may include abrasive particles having an average particle size (D50) of at least 40 microns. The bonded abrasive bodies herein may utilize relatively large size abrasive particles, which have historically proven difficult to homogeneously distribute throughout the mixture and resulting bonded abrasive body. Notably, due to their relatively larger sizes, such particles have a tendency to segregate and agglomerate in the gel and mixture, resulting in abrasive products with in-homogeneities and density variations. In one particular embodiment, the abrasive particles can have an average particle size (D50) of at least 50 microns or at least 55 microns or at least 60 microns or at least 65 microns or at least 70 microns or at least 75 microns or at least 80 microns or at least 85 microns or at least 90 microns or at least 95 microns or at least 100 microns or at least 105 microns or at least 110 microns or at least 115 microns or at least 120 microns or at least 130 microns or at least 150 microns or at least 175 microns or at least 200 microns or at least 250 microns or at least 300 microns or at least 350 microns or at least 400 microns or at least 450 microns or at least 500 microns or at least 600 microns or at least 700 microns or at least 800 microns. Still, in one non-limiting embodiment, the abrasive particles may have an average particle size (D50) of not greater than 5000 microns or not greater than 4000 microns or not greater than 3000 microns or not greater than 2000 microns or not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 150 microns or not greater than 130 microns. The abrasive particles may have an average particle size (D50) within a range including any of the minimum and maximum values noted above, including for example, but not limited to within a range of at least 50 microns to not greater than 5000 microns or within a range of at least 100 micros to not greater than 2000 microns or within a range of at least 50 microns to not greater than 800 microns or even within a range of at least 50 microns to not greater than 400 microns.

The abrasive particles may have various compositions, shapes, sizes, and other features. For example, the abrasive particles may include an abrasive particle type such as from the group of claimed unagglomerated particles, agglomerated particles, shaped abrasive particles, shaped abrasive composites, constant thickness abrasive particles (CTAP), randomly shaped abrasive particles, or any combination thereof. In another embodiment, the abrasive particles may include a material such as from the group of oxides, borides, nitrides, carbides, oxynitrides, oxycarbides, amorphous, monocrystalline, polycrystalline, superabrasive or any combination thereof.

In accordance with one embodiment, the bonded abrasive body 201 may have a particular structure that may facilitate improved performance. For example, the bonded abrasive body 201 may include a content of abrasive particles of at least 20 vol % for a total volume of the bonded abrasive body 201, such as at least 25 vol % or at least 30 vol % or at least 35 vol % or at least 40 vol % or at least 45 vol % or at least 50 vol % or at least 55 vol %. Still, in one non-limiting embodiment, the bonded abrasive body 201 may include a content of abrasive particles of not greater than 65 vol % for a total volume of the bonded abrasive body 201, such as not greater than 60 vol % or not greater than 55 vol % or not greater than 50 vol % or not greater than 45 vol % or not greater than 40 vol % or not greater than 35 vol % or not greater than 30 vol %. The content of abrasive particles in the bonded abrasive body 201 can be within a range including any of the minimum and maximum percentages noted above.

In one particular aspect, the bonded abrasive body 201 can include a bond material including an inorganic material. Some suitable examples of an inorganic material can include a metal, metal alloy, ceramic, vitreous phase, or any combination thereof. Furthermore, the bond material may include at least one of a vitreous phase, amorphous phase, a polycrystalline phase, a monocrystalline phase, or any combination thereof. In certain instances, the bond material can consist essentially of a polycrystalline phase, a vitreous phase, or a monocrystalline phase.

For at least one embodiment, the bond material may include an oxide, such as a vitreous oxide-containing material. Some suitable examples of oxides can include silicon dioxide, boron oxide, aluminum oxide, alkali oxide ($M_2O$), alkaline earth oxide (MO) transition metal oxide, rare earth metal oxide, or any combination thereof. In particular instances, the bond material may be a soda-lime vitreous material, borosilicate material, or aluminosilicate material.

The bonded abrasive body 201 may include a particular content of bond material that may facilitate improved performance. For example, the bonded abrasive body 201 may include a content of bond material of at least 2 vol % for a total volume of the bonded abrasive body 201, such as at least 3 vol % or at least 4 vol % or at least 5 vol % or at least 6 vol % or at least 8 vol % or at least 10 vol % or at least 12 vol % or at least 14 vol % or at least 16 vol % or at least 18 vol % or at least 20 vol % or at least 25 vol % or at least 30 vol % or at least 35 vol % or at least 40 vol %. Still, in one non-limiting embodiment, the bonded abrasive body 201 can include a content of bond material of not greater than 65 vol % for a total volume of the bonded abrasive body 201 or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 22 vol % or not greater than 20 vol % or not greater than 18 vol % or not greater than 16 vol % or not greater than 14 vol % or not greater than 12 vol % or not greater than 10 vol % or not greater than 8 vol % or not greater than 6 vol %. It will be appreciated that the content of bond material can be within a range including any of the minimum and maximum values noted above, including for example, a content of bond material within a range of at least 1 vol % and not greater than 15 vol % for a total volume of the body.

The bonded abrasive body 201 may include a particular structure such that it has a controlled content of the bond material relative to the content of abrasive particles. For example, in one instance, the body can have an ABR Factor (Cb/Cap) within a range of at least 0.5 to not greater than 10, wherein Cb represents the vol % of the bond material for the total volume of the bonded abrasive body 201 and Cap represents the vol % of the abrasive particles for the total volume of the bonded abrasive body 201. In particular instances, the bonded abrasive body 201 may have an ABR Factor (Cb/Cap) of at least 0.55, such as at least 0.6 or at least 0.65 or at least 0.7 or at least 0.75 or at least 0.8 or at least 0.85 or at least 0.9 or at least 0.95 or at least 1 or at least 1.05 or at least 1.1 or at least 1.15 or at least 1.2 or at least 1.25 or at least 1.3 or at least 1.35 or at least 1.4 or at least 1.45 or at least 1.5 or at least 1.55 or at least 1.6 or at least 1.65 or at least 1.7 or at least 1.75 or at least 1.8 or at least 1.85 or at least 1.9 or at least 1.95 or at least 2 or at least 2.2 or at least 2.5 or at least 2.8 or at least 3 or at least 3.5 or at least 4 or at least 4.5 or at least 5 or at least 5.5 or at least 6 or at least 7 or at least 8 or at least 9. Still, in another non-limiting embodiment, the bonded abrasive body 201 can have an ABR Factor (Cb/Cap) of not greater than 9, such as not greater than 8.5 or not greater than 8 or not greater than 7.5 or not greater than 7 or not greater than 6.5 or not greater than 6 or not greater than 5.5 or not greater than 5 or not greater than 4.5 or not greater than 4 or not greater than 3.5 or not greater than 3 or not greater than 2.5 or not greater than 2 or not greater than 1.5 or not greater than 1 or not greater than 0.9. It will be appreciated that the ABR Factor (Cb/Cap) can be within a range including any of the minimum and maximum values noted above.

In another embodiment, the bond abrasive body 201 may have a particular type and content of porosity that may facilitate improved performance of the abrasive article. For example, the bonded abrasive body 201 can have an average pore size (D50) of at least 10 microns, such as at least 20 microns or at least 30 microns or at least 40 microns or at least 50 microns or at least 60 microns or at least 70 microns or at least 80 microns or at least 90 microns or at least 100 microns or at least 200 microns or at least 300 microns or at least 400 microns or at least 500 microns or at least 600 microns or at least 700 microns or at least 800 microns or at least 900 microns. Still, in one non-limiting embodiment, the average pore size (D50) of the porosity of the bonded abrasive body 201 can be not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 100 microns or not greater than 80 microns or not greater than 60 microns or not greater than 40 microns or not greater than 20 microns or not greater than 10 microns. It will be appreciated that the average pore size can be within a range including any of the minimum and maximum values noted above.

The bonded abrasive body 201 may have a particular content of porosity that may facilitate improved performance. For example, the bonded abrasive body 201 may include at least 20 vol % porosity for a total volume of the bonded abrasive body 201, such as at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol %. Still, in one non-limiting embodiment, the bonded abrasive body 201 can include not greater than 95 vol % porosity for a total volume of the bonded abrasive body 201, such as not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol %. It will be appreciated that the content of porosity in the bonded abrasive body 201 can be within a range including any of the minimum and maximum percentages noted above.

The porosity of the bonded abrasive body 201 may include open porosity, closed porosity, or a combination thereof. Open porosity can be defined as interconnected channels extending through the bonded abrasive body 201. Closed porosity can define discrete and isolated voids contained in the bond material. In accordance with an embodiment, In accordance with an embodiment, the bonded abrasive body 201 may include a particular content of open porosity that may facilitate improved performance. For example, the bonded abrasive body 201 may include at least 15 vol % open porosity for a total volume of the porosity, such as at least 20 vol % or at least 30 vol % or at least 40 vol % or at least 50 vol % or at least 60 vol % or at least 70 vol % or at least 80 vol % or at least 90 vol %. Still, in one non-limiting embodiment, the bonded abrasive body 201 can include not greater than 95 vol % open porosity for a total volume of the porosity in the bonded abrasive body 201, such as not greater than 90 vol % or not greater than 80 vol % or not greater than 70 vol % or not greater than 60 vol % or not greater than 50 vol % or not greater than 40 vol % or not greater than 30 vol % or not greater than 20 vol %. In at least one embodiment, all of the porosity in the bonded abrasive body 201 can be open porosity. It will be appreciated that the content of open porosity can be within a range including any of the minimum and maximum percentages noted above In accordance with an embodiment, the bonded abrasive body 201 may include a particular content of closed porosity that may facilitate improved performance. For example, the bonded abrasive body 201 may include at least 10 vol % closed porosity for a total content of the porosity in the bonded abrasive body 201, such as at least 15 vol % or at least 20 vol % or at least 30 vol % or at least 40 vol % or at least 50 vol % or at least 60 vol % or at least 70 vol % or at least 80 vol % or at least 90 vol %. Still, in one non-limiting embodiment, the bonded abrasive body 201 can include not greater than 95 vol % closed porosity for a total volume of the porosity in the bonded abrasive body 201, such as not greater than 90 vol % or not greater than 80 vol % or not greater than 70 vol % or not greater than 60 vol % or not greater than 50 vol % or not greater than 40 vol % or not greater than 30 vol % or not greater than 20 vol %. In at least one embodiment, all of the porosity in the bonded abrasive body 201 can be closed porosity. It will be appreciated that the content of closed porosity can be within a range including any of the minimum and maximum percentages noted above The processes of the embodiments herein may facilitate formation of bonded abrasive articles having particular grades and/or structures utilizing relatively large abrasive particles and having a superior homogeneity in terms of the distribution of phases throughout the body in a manner that it was not previously achieved by conventional processing. Notably, the bonded abrasive body 201 may have a particular homogeneity factor of not greater than 85. For example, the Homogeneity Factor may be not greater than 84 or not greater than 82 or not greater than 80 or not greater than 78 or not greater than 76 or not greater than 74 or not greater than 72 or not greater than 70 or not greater than 68 or not greater than 66 or not greater than 64 or not greater than 62 or not greater than 60 or not greater than 58 or not greater than 56 or not greater than 54 or not greater than 52 or not greater than 50 or not greater than 48 or not greater than 46 or not greater than 44 or not greater than 42 or not greater than 40 or not greater than 38 or not greater than 36 or not greater than 34 or not greater than 32 or not greater than 30 or not greater than 28 or not greater than 26 or not greater than 24 or not greater than 22 or not greater than 20 or not greater than 18 or not greater than 16 or not greater than 14 or not greater than 12 or not greater than 10 or not greater than 8 or not greater than 6 or not greater than 4 or not greater than 2. Still, in one non-limiting embodiment, the Homogeneity Factor may be at least 1, such as at least 2 or at least 4 or at least 6 or at least 8 or at least 10 or at least 12 or at least 14 or at least 16 or at least 18 or at least 20 or at least 22 or at least 24 or at least 26 or at least 28 or at least 30 or at least 32 or at least 34 or at least 36 or at least 38 or at least 40 or at least 42 or at least 44 or at least 46 or at least 48 or at least 50 or at least 52 or at least 54 or at least 56 or at least 58 or at least 60 or at least 62 or at least 64 or at least 66 or at least 68 or at least 70 or at least 72 or at least 74 or at least 76 or at least 78 or at least 80. It will be appreciated that the Homogeneity Factor can be within a range including any of the minimum and maximum values noted above.

The Homogeneity Factor can be evaluated by measuring the time of flight information through the bonded abrasive body via ultrasound system Mistras UltraPAC (UPK-T36-HS). Specifically, the bonded abrasive body can be submersed in water to fill all open porosity with the water. A single, pulse echo ultrasound sensor (Model #KS75-1) with a 1 mHz immersion sensor and an active diameter of 19.0 mm is placed 1 inch from the wheel. The sensor is attached to a DC step motor that moves the sensor over the entire surface of the wheel while maintaining the 1 inch distance. UTWin V3.62 software is used to control the movement of the step motor. The gain is set at 10 cB, 400V pulser, LP filter of 2.0 mHz, a HP filter of 0.5 mHz, and a 100 mHz sampling rate. The data is acquired and processed by JET color map array format to create an RGB image via the UTWin software. The scan resolution is 1.0×1.0 mm and the scan speed is 150 mm/s in the X-direction and 50 mm/s in the Z-direction.

Using the color (red-green-blue or RGB) images from the ultrasound analysis, the images are analyzed with image processing software, such as Matlab. The RGB image is converted in Matlab to a LAB image using the "rgb2lab" function in Matlab, which creates a suitable image to identify only those areas associated with the wheel. The portions of the image having a value of 100 are associated with open space (i.e., not the wheel) and removed from the image.

Next, the RGB image is converted into an index image where each pixel is assigned a color value out of 256 possible colors (i.e., values from 0-255). This is completed using the "rgb2ind" function of Matlab. The darkest blue is associated with the lowest value or 0 and the brightest red is associated with the highest value or 255.

After the index image is created, it is compared to the LAB image to ensure that only those pixels associated with the wheel are evaluated. The comparison is completed using a logical indexing operation where pixels from the index image that are not associated with wheel area are removed from further analysis. The result is an area-corrected index image.

Figure 5:
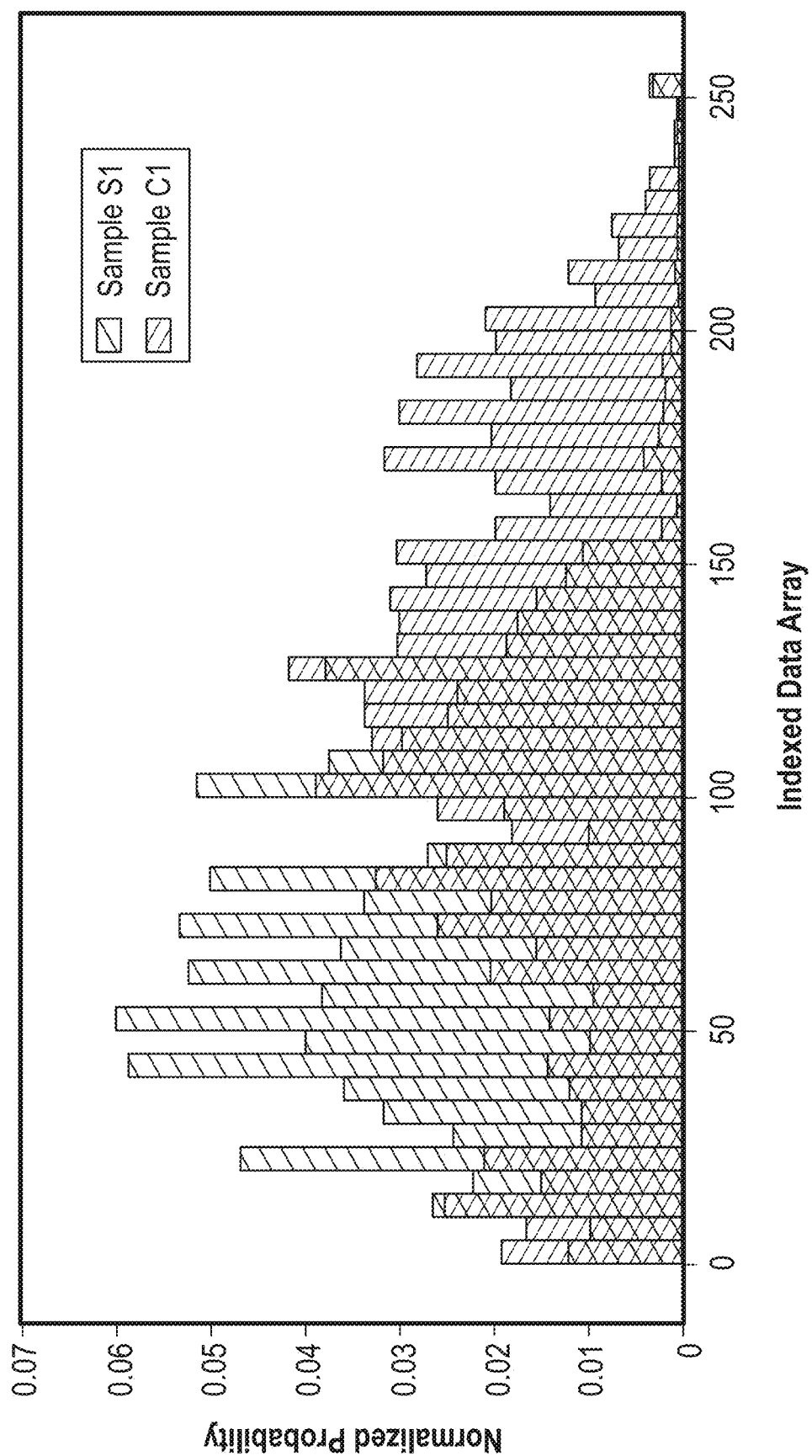
FIG. 5 includes a normalized probability plot for Samples S1 and C1 to evaluate the Homogeneity Factor.

The area-corrected index image is then used to create a normalized probability plot as illustrated in FIG. 5. Each box on the plot represents 5 sequential values between 0 and 255. For example, the first box (furthest left) represents the number of pixels having a value between 0 and 4. From the normalized probability plot and data used to generate the plot, statistical percentiles are evaluated. The percentiles include the 25th percentile, 50th percentile and 75th percentile. The Homogeneity Factor is the difference between the 75th percentile and the 25th percentile. A body with a greater homogeneity of its components has less spread in the distribution between 0-255 and thus also has a lower difference between the 75th percentile and the 25th percentile.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive article comprising:
a bonded abrasive having a body comprising a diameter of at least 260 mm and a volume of at least 20 cubic centimeters, the body further comprising:
a bond material comprising an inorganic material;
abrasive particles contained within the body, wherein the abrasive particles have an average particle size (D50) of at least 40 microns; and
a Homogeneity Factor of not greater than 85.

Embodiment 2. The abrasive article of embodiment 1, wherein the body comprises an ABR Factor (Cb/Cap) within a range of at least 0.5 to not greater than 10, wherein Cb represents the vol % of the bond material for the total volume of the body and Cap represents the vol % of the abrasive particles for the total volume of the body.

Embodiment 3. The abrasive article of embodiment 2, wherein the body comprises an ABR Factor (Cb/Cap) of at least 0.55 or at least 0.6 or at least 0.65 or at least 0.7 or at least 0.75 or at least 0.8 or at least 0.85 or at least 0.9 or at least 0.95 or at least 1 or at least 1.05 or at least 1.1 or at least 1.15 or at least 1.2 or at least 1.25 or at least 1.3 or at least 1.35 or at least 1.4 or at least 1.45 or at least 1.5 or at least 1.55 or at least 1.6 or at least 1.65 or at least 1.7 or at least 1.75 or at least 1.8 or at least 1.85 or at least 1.9 or at least 1.95 or at least 2 or at least 2.2 or at least 2.5 or at least 2.8 or at least 3 or at least 3.5 or at least 4 or at least 4.5 or at least 5 or at least 5.5 or at least 6 or at least 7 or at least 8 or at least 9.

Embodiment 4. The abrasive article of embodiment 2, wherein the body comprises an ABR Factor (Cb/Cap) of not greater than 9 or not greater than 8.5 or not greater than 8 or not greater than 7.5 or not greater than 7 or not greater than 6.5 or not greater than 6 or not greater than 5.5 or not greater than 5 or not greater than 4.5 or not greater than 4 or not greater than 3.5 or not greater than 3 or not greater than 2.5 or not greater than 2 or not greater than 1.5 or not greater than 1 or not greater than 0.9.

Embodiment 5. The abrasive article of embodiment 1, wherein the body comprises a Homogeneity Factor of at least 1 or at least 2 or at least 4 or at least 6 or at least 8 or at least 10 or at least 12 or at least 14 or at least 16 or at least 18 or at least 20 or at least 22 or at least 24 or at least 26 or at least 28 or at least 30 or at least 32 or at least 34 or at least 36 or at least 38 or at least 40 or at least 42 or at least 44 or at least 46 or at least 48 or at least 50 or at least 52 or at least 54 or at least 56 or at least 58 or at least 60 or at least 62 or at least 64 or at least 66 or at least 68 or at least 70 or at least 72 or at least 74 or at least 76 or at least 78 or at least 80.

Embodiment 6. The abrasive article of embodiment 1, wherein the Homogeneity Factor is not greater than 84 or not greater than 82 or not greater than 80 or not greater than 78 or not greater than 76 or not greater than 74 or not greater than 72 or not greater than 70 or not greater than 68 or not greater than 66 or not greater than 64 or not greater than 62 or not greater than 60 or not greater than 58 or not greater than 56 or not greater than 54 or not greater than 52 or not greater than 50 or not greater than 48 or not greater than 46 or not greater than 44 or not greater than 42 or not greater than 40 or not greater than 38 or not greater than 36 or not greater than 34 or not greater than 32 or not greater than 30 or not greater than 28 or not greater than 26 or not greater than 24 or not greater than 22 or not greater than 20 or not greater than 18 or not greater than 16 or not greater than 14 or not greater than 12 or not greater than 10 or not greater than 8 or not greater than 6 or not greater than 4 or not greater than 2.

Embodiment 7. The abrasive article of embodiment 1, wherein the body comprises a diameter of at least 270 mm or at least 280 mm or at least 290 mm or at least 300 mm or at least 325 mm or at least 350 mm or at least 375 mm or at least 400 mm or at least 425 mm or at least 450 mm or at least 475 mm or at least 500 mm or at least 525 mm or at least 550 mm or at least 575 mm.

Embodiment 8. The abrasive article of embodiment 1, wherein the body comprises a diameter of not greater than 800 mm or not greater than 700 mm or not greater than 600 mm or not greater than 575 mm or not greater than 550 mm or not greater than 525 mm or not greater than 500 mm or not greater than 475 mm or not greater than 450 mm or not greater than 425 mm or not greater than 400 mm or not greater than 375 mm or not greater than 350 mm or not greater than 325 mm or not greater than 300 mm or not greater than 290 mm or not greater than 280 mm.

Embodiment 9. The abrasive article of embodiment 1, wherein the diameter is within a range of at least 260 mm to not greater than 600 mm.

Embodiment 10. The abrasive article of embodiment 1, wherein the body comprises a volume of at least 1 cm$^3$.

Embodiment 11. The abrasive article of embodiment 1, wherein the body comprises a volume of not greater than 1000 cm³.

Embodiment 12. The abrasive article of embodiment 1, wherein the body comprises a volume of at least 1 cm³ to not greater than 1000 cm³.

Embodiment 13. The abrasive article of embodiment 1, wherein the body comprises a thickness of at least 2 mm.

Embodiment 14. The abrasive article of embodiment 1, wherein the body comprises a thickness of not greater than 500 mm Embodiment 15. The abrasive article of embodiment 1, wherein the body comprises a thickness within a range of at least 2 mm and not greater than 500 mm.

Embodiment 16. The abrasive article of embodiment 1, wherein the body comprises a thickness within a range of at least 4 mm and not greater than 20 mm.

Embodiment 17. The abrasive article of embodiment 1, wherein the porosity comprises an average pore size (D50) within a range of at least 10 microns and not greater than 1000 microns.

Embodiment 18. The abrasive article of embodiment 1, wherein the body comprises a porosity of at least 20 vol % for a total volume of the body or at least 25 vol % or at least 30 vol % or at least 35 vol % or at least 40 vol % or at least 45 vol % or at least 50 vol % or at least 55 vol % or at least 60 vol % or at least 65 vol % or at least 70 vol % or at least 75 vol % or at least 80 vol %.

Embodiment 19. The abrasive article of embodiment 1, wherein the body comprises a porosity of not greater than 95 vol % for a total volume of the body or not greater than 90 vol % or not greater than 85 vol % or not greater than 80 vol % or not greater than 75 vol % or not greater than 70 vol % or not greater than 65 vol % or not greater than 60 vol % or not greater than 55 vol % or not greater than 50 vol % or not greater than 45 vol % or not greater than 40 vol % or not greater than 35 vol % or not greater than 30 vol %.

Embodiment 20. The abrasive article of embodiment 1, wherein the body comprises a porosity within a range of at least 20 vol % and not greater than 95 vol % for a total volume of the body.

Embodiment 21. The abrasive article of embodiment 1, wherein at least a portion of the total porosity is open porosity, wherein the open porosity defines interconnected channels extending through the body.

Embodiment 22. The abrasive article of embodiment 21, wherein the body comprises at least 10 vol % open porosity for a total content of the porosity in the body or at least 15 vol % or at least 20 vol % or at least 30 vol % or at least 40 vol % or at least 50 vol % or at least 60 vol % or at least 70 vol % or at least 80 vol % or at least 90 vol % or wherein essentially all of the porosity is open porosity.

Embodiment 23. The abrasive article of embodiment 21, wherein the body comprises not greater than 95 vol % open porosity for a total content of the porosity in the body or not greater than 90 vol % or not greater than 80 vol % or not greater than 70 vol % or not greater than 60 vol % or not greater than 50 vol % or not greater than 40 vol % or not greater than 30 vol % or not greater than 20 vol %.

Embodiment 24. The abrasive article of embodiment 1, wherein at least a portion of the total porosity is closed porosity, wherein the closed porosity defines discrete and isolated voids contained in the bond material.

Embodiment 25. The abrasive article of embodiment 24, wherein the body comprises at least 10 vol % closed porosity for a total content of the porosity in the body or at least 15 vol % or at least 20 vol % or at least 30 vol % or at least 40 vol % or at least 50 vol % or at least 60 vol % or at least 70 vol % or at least 80 vol % or at least 90 vol % or wherein essentially all of the porosity is closed porosity.

Embodiment 26. The abrasive article of embodiment 24, wherein the body comprises not greater than 95 vol % closed porosity for a total content of the porosity in the body or not greater than 90 vol % or not greater than 80 vol % or not greater than 70 vol % or not greater than 60 vol % or not greater than 50 vol % or not greater than 40 vol % or not greater than 30 vol % or not greater than 20 vol %.

Embodiment 27. The abrasive article of embodiment 1, wherein the abrasive particles have an average particle size (D50) of at least 45 microns or at least 50 microns or at least 55 microns or at least 60 microns or at least 65 microns or at least 70 microns or at least 75 microns or at least 80 microns or at least 85 microns or at least 90 microns or at least 95 microns or at least 100 microns or at least 105 microns or at least 110 microns or at least 115 microns or at least 120 microns or at least 130 microns or at least 150 microns or at least 175 microns or at least 200 microns or at least 250 microns or at least 300 microns or at least 350 microns or at least 400 microns or at least 450 microns or at least 500 microns or at least 600 microns or at least 700 microns or at least 800 microns.

Embodiment 28. The abrasive article of embodiment 1, wherein the abrasive particles have an average particle size (D50) of not greater than 5000 microns or not greater than 4000 microns or not greater than 3000 microns or not greater than 2000 microns or not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 150 microns or not greater than 130 microns.

Embodiment 29. The abrasive article of embodiment 1, wherein the abrasive particles comprise an abrasive particle type selected from the group consisting of unagglomerated particles, agglomerated particles, shaped abrasive particles, shaped abrasive composites, constant thickness abrasive particles (CTAP), randomly shaped abrasive particles, or any combination thereof.

Embodiment 30. The abrasive article of embodiment 1, wherein the abrasive particles comprise a material selected from the group consisting of oxides, borides, nitrides, carbides, oxynitrides, oxycarbides, amorphous, monocrystalline, polycrystalline, superabrasive or any combination thereof.

Embodiment 31. The abrasive article of embodiment 1, wherein the body comprises a content of abrasive particles of at least 20 vol % for a total volume of the body or at least 25 vol % or at least 30 vol % or at least 35 vol % or at least 40 vol % or at least 45 vol % or at least 50 vol % or at least 55 vol %.

Embodiment 32. The abrasive article of embodiment 1, wherein the body comprises a content of abrasive particles of not greater than 65 vol % for a total volume of the body or not greater than 60 vol % or not greater than 55 vol % or not greater than 50 vol % or not greater than 45 vol % or not greater than 40 vol % or not greater than 35 vol % or not greater than 30 vol %.

Embodiment 33. The abrasive article of embodiment 1, wherein the body comprises a content of abrasive particles within a range of at least 20 vol % and not greater than 50 vol % for a total volume of the body.

Embodiment 34. The abrasive article of embodiment 1, wherein the body comprises a content of bond material of at least 1 vol % for a total volume of the body or at least 2 vol % or at least 3 vol % or at least 4 vol % or at least 5 vol % or at least 6 vol % or at least 8 vol % or at least 10 vol % or at least 12 vol % or at least 14 vol % or at least 16 vol % or at least 18 vol % or at least 20 vol % or at least 25 vol % or at least 30 vol % or at least 35 vol % or at least 40 vol %.

Embodiment 35. The abrasive article of embodiment 1, wherein the body comprises a content of bond material of not greater than 65 vol % for a total volume of the body or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 22 vol % or not greater than 20 vol % or not greater than 18 vol % or not greater than 16 vol % or not greater than 14 vol % or not greater than 12 vol % or not greater than 10 vol % or not greater than 8 vol % or not greater than 6 vol %.

Embodiment 36. The abrasive article of embodiment 1, wherein the body comprises a content of bond material within a range of at least 1 vol % and not greater than 15 vol % for a total volume of the body.

Embodiment 37. The abrasive article of embodiment 1, wherein the bond material comprises an inorganic material selected from the group consisting of metal, metal alloy, ceramic, vitreous, or any combination thereof.

Embodiment 38. The abrasive article of embodiment 1, wherein the bond material comprises a polycrystalline phase, an amorphous phase, a monocrystalline phase, or any combination thereof.

Embodiment 39. The abrasive article of embodiment 1, wherein the bond material consists essentially of a polycrystalline phase, an amorphous phase, or a monocrystalline phase.

Embodiment 40. The abrasive article of embodiment 1, wherein the bond material comprises an oxide.

Embodiment 41. The abrasive article of embodiment 1, wherein the bond material comprises at least one composition selected from the group consisting of silicon dioxide ($SiO_2$), boron oxide ($B_2O_3$), aluminum oxide ($Al_2O_3$), alkali oxide ($M_2O$), alkaline earth oxide (MO) transition metal oxide, rare earth metal oxide, or any combination thereof.

Embodiment 42. A method of making an abrasive article comprising:
forming a mixture comprising abrasive particles, a bond precursor material and a gelling agent;
forming a bonded abrasive body from the mixture, wherein the bonded abrasive body comprises a bond material comprising an inorganic material and further comprising a Homogeneity Factor of not greater than 85.

Embodiment 43. A method of making an abrasive article comprising:
forming a mixture comprising abrasive particles, a bond precursor material and a gelling agent;
adding a cationic agent to the mixture and forming a gel;
forming a green body from the gel; and
forming a bonded abrasive body from the green body.

Embodiment 44. The method of embodiment 42, wherein forming a mixture further includes adding a cationic agent to the mixture and forming a gel.

Embodiment 45. The method of any one of embodiments 43 and 44, wherein the cationic agent comprises a cation selected from the group consisting of sodium, potassium, lithium, ammonium, copper, magnesium, iron, calcium, or any combination thereof.

Embodiment 46. The method of any one of embodiments 43 and 44, wherein the mixture includes at least 0.1 wt % of the cationic agent for a total weight of the mixture.

Embodiment 47. The method of any one of embodiments 43 and 44, wherein the mixture includes not greater than 6 wt % of the cationic agent for a total weight of the mixture.

Embodiment 48. The method of any one of embodiments 42 and 43, wherein the gelling agent is selected from the group consisting of agar, agarose, xanthan gum, carboxy methyl cellulose, gellan gum, carrageenan gum, guar gum, tara gum, cellulose gum, locust bean gum, or any combination thereof.

Embodiment 49. The method of any one of embodiments 42 and 43, wherein the mixture includes at least 0.1 wt % of the gelling agent for a total weight of the mixture.

Embodiment 50. The method of any one of embodiments 42 and 43, wherein the mixture includes not greater than 10 wt % of the gelling agent for a total weight of the mixture.

Embodiment 51. The method of any one of embodiments 42 and 43, wherein the abrasive particles comprise a material selected from the group consisting of oxides, borides, nitrides, carbides, oxynitrides, oxycarbides, amorphous, monocrystalline, polycrystalline, superabrasive or any combination thereof.

Embodiment 52. The method of any one of embodiments 42 and 43, wherein the mixture includes at least 20 wt % of the abrasive particles for a total weight of the mixture.

Embodiment 53. The method of any one of embodiments 42 and 43, wherein the mixture includes not greater than 80 wt % of the abrasive particles for a total weight of the mixture.

Embodiment 54. The method of any one of embodiments 42 and 43, wherein the bond precursor material comprises an inorganic material selected from the group consisting of metal, metal alloy, ceramic, vitreous, or any combination thereof.

Embodiment 55. The method of any one of embodiments 42 and 43, wherein the mixture includes at least 1 wt % of the bond precursor material for a total weight of the mixture.

Embodiment 56. The method of any one of embodiments 42 and 43, wherein the mixture includes not greater than 30 wt % of the bond precursor material for a total weight of the mixture.

Embodiment 57. The method of any one of embodiments 42 and 43, further comprising forming a gel by heating the mixture to a gelling temperature.

Embodiment 58. The method of embodiment 57, wherein the mixture is mixed while heating the mixture to a gelling temperature.

Embodiment 59. The method of embodiment 57, wherein the gelling temperature is at least 50° C. or at least 60° C. or at least 70° C. or at least 80° C. or at least 90° C. or at least 100° C. or at least 120° C. or at least 150° C.

Embodiment 60. The method of embodiment 57, wherein the gelling temperature is not greater than 300° C. or not greater than 150° C. or not greater than 200° C. or not greater than 150° C. or not greater than 100° C. or not greater than 90° C.

Embodiment 61. The method of any one of embodiments 42 and 43, wherein forming the mixture further includes adding a carrier comprising water.

Embodiment 62. The method of any one of embodiments 42 and 43, wherein forming the mixture into a gel includes:
 a) forming a mixture including the gel and the water;
 b) adding one of a bond precursor material, the abrasive particles or an additive to the mixture after step a); and
 c) adding a cationic agent to the mixture after step b).

Embodiment 63. The method of any one of embodiments 42 and 43, wherein forming the mixture includes adding a dispersant to the mixture, wherein the dispersant is selected from the group consisting of sodium polyacrylate, copolymer with pigment affinic group, ammonium polymeta acrylate, ammonium polyacrylate, polyacrylic acid, ammonium salt in an acrylic polymer in water, citric acid, sodium dodecylbenzenesulfonate, cetyltrimethyl ammonium bromide.

Embodiment 64. The method of any one of embodiments 43 and 44, wherein the mixture includes at least 0.1 wt % of a dispersant for a total weight of the mixture.

Embodiment 65. The method of any one of embodiments 43 and 44, wherein the mixture includes not greater than 6 wt % of a dispersant for a total weight of the mixture.

Embodiment 66. The method of any one of embodiments 42 and 43, wherein forming the mixture includes adding a surfactant to the mixture, wherein the surfactant is selected from the group consisting of sodium lauroyl sarcosinate, sodium laurel sulfate, sodium laurate, sodium stearate, sodium alkyl sulfate, sodium dodecyl sulfate, sorbitan, polyethylene glycol, polysorbate, glycerol monosterate, egg lecithin.

Embodiment 67. The method of any one of embodiments 42 and 43, wherein the mixture includes at least 0.1 wt % of a surfactant for a total weight of the mixture.

Embodiment 68. The method of any one of embodiments 43 and 44, wherein the mixture includes not greater than 6 wt % of a surfactant for a total weight of the mixture.

Embodiment 69. The method embodiment 42, further comprising:
  forming a gel from the mixture; and
  forming a green body from the gel.

Embodiment 70. The method of any one of embodiments 43 and 69, wherein forming the green body includes at least one process selected from the group consisting of pressing, molding, casting, drying, or any combination thereof.

Embodiment 71. The method of any one of embodiments 43 and 69, wherein the gel includes a solid self-supporting structure that includes water contained in an integrated network.

EXAMPLES

Example 1

A representative sample (Sample S1) is made according to the following process. A carrier of deionized water is obtained and approximately 3000 kg of water is measured. Approximately 10,000 kg of abrasive particles having an average particle size (D50) of approximately 220 microns, and commercially available as white fused alundum from Saint-Gobain Corporation, is prepared. Approximately 2200 kg of bond precursor material, commercially available as Vitrium from Saint-Gobain Corporation, is also prepared. Approximately 20 g of a surfactant, commercially available as Perlastan L30 from Schill & Seilacher GmbH, is also prepared. Approximately 120 g of a gelling agent, commercially available as Kelcogel from CP Kelco Corporation, is prepared. Approximately 60 g of a dispersant commercially available as Darvan 821A from Vanderbilt Minerals is also prepared. Approximately 20 g of a cationic agent commercially available as calcium chloride from Fisher Scientific is prepared.

The gelling agent is added to the water while stirring. During mixing the mixture is heated at a gelling temperature of approximately 80-85° C. The bond precursor material is then added to the gel, followed by the dispersant, followed by the abrasive particles, followed by the surfactant, and finally the cationic agent is added last. The addition of the cationic agent initiates cross-linking and the formation of the gel. Mixing is continued in a reduced pressure atmosphere of approximately 0.5-0.99 bar to remove larger pores from the gel.

The gel is then poured into a production tool to cast a green body from the gel. During casting, no additional pressure or temperature is applied to the gel, and the gel is free cast to form the green body. The gel dries, and the green body stabilizes. It will be understood, that other processes may optionally apply pressure to the gel to form the green body.

After forming the green body from the gel, the green body is fired to create a vitreous bond material from the bond precursor material. The firing schedule includes a ramp of approximately 100° C./hr from room temperature to a firing temperature of approximately 910-925° C. with a hold for approximately 8 hours under a normal atmosphere. After a suitable time at the firing temperature, the fired body is cooled with a ramp down of approximately 30° C./hr.

The abrasive article undergoes finishing to finalize the dimensions of the bonded abrasive body. The bonded abrasive body has a Homogeneity Factor of approximately 62, 13 vol % bond material that consists essentially of a vitreous material, approximately 44 vol % abrasive particles, approximately 43 vol % porosity, including approximately 30 vol % open porosity for the total content of porosity and approximately 70 vol % closed porosity for the total content of porosity, and an average pore size of approximately 110 microns. Additionally, the bonded abrasive body of Sample S1 has a diameter of 127 mm, a thickness of approximately 25 mm, and a volume of approximately 225 cm$^3$.

Figure 3:
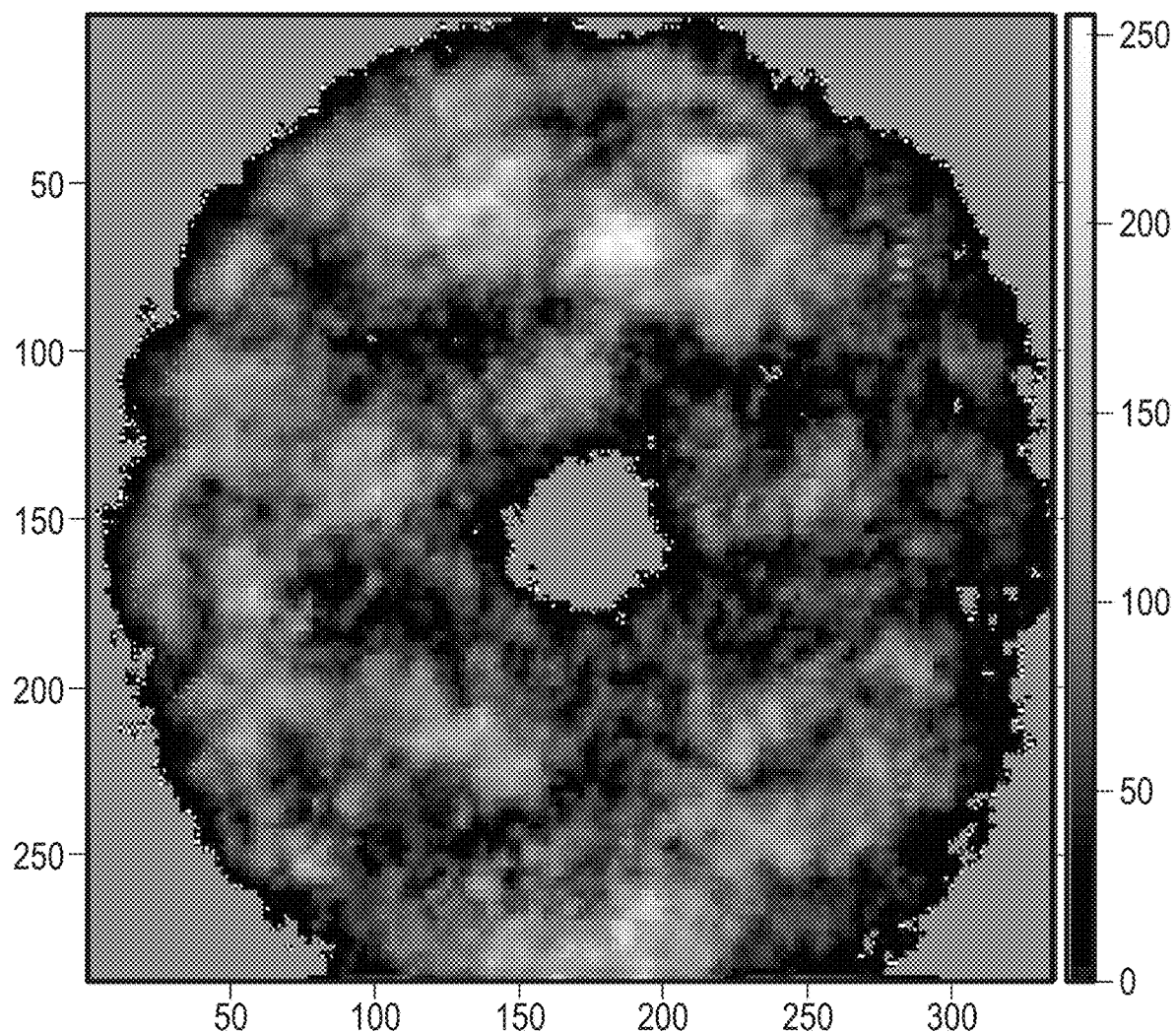
FIG. 3 includes an ultrasound image of an abrasive article according to an embodiment.

FIG. 3 includes an ultrasound image of Sample S1 used to evaluate the Homogeneity Factor.

Example 2

A conventional sample (Sample C1) is formed according to the following process. Abrasive is weighed and mixed in a large mixer with dextrin as the binder. The contents are mixed for 5 minutes. Animal glue is then added to the mix and mixed for 3 minutes. Mixing is stopped when the animal glue wets the surface of the abrasive grain for the dextrin to coat uniformly on the surface. The bond is then added to the mix and the contents are mixed for 5 minutes till the bond uniformly coats the abrasive grain. Another round of dextrin is added to the mix to impart necessary green strength to survive compaction step. The mix is then sieved to remove large clumps and then distributed evenly into a mold. The mold is then raked to remove air and the mix is compacted/pressed (80 tonnes of force applied) to the desired volume. The wheels are then dried for 12 hours at 80° C. and fired at 915° C. at a ramp rate of 100° C./hr and soaked for 8 hours. The wheel is then finished to accepted dimensions and analyzed using ultrasound technique.

The bonded abrasive wheel includes 13 vol % bond, 44 vol % abrasives and 43 vol % porosity.

Figure 4:
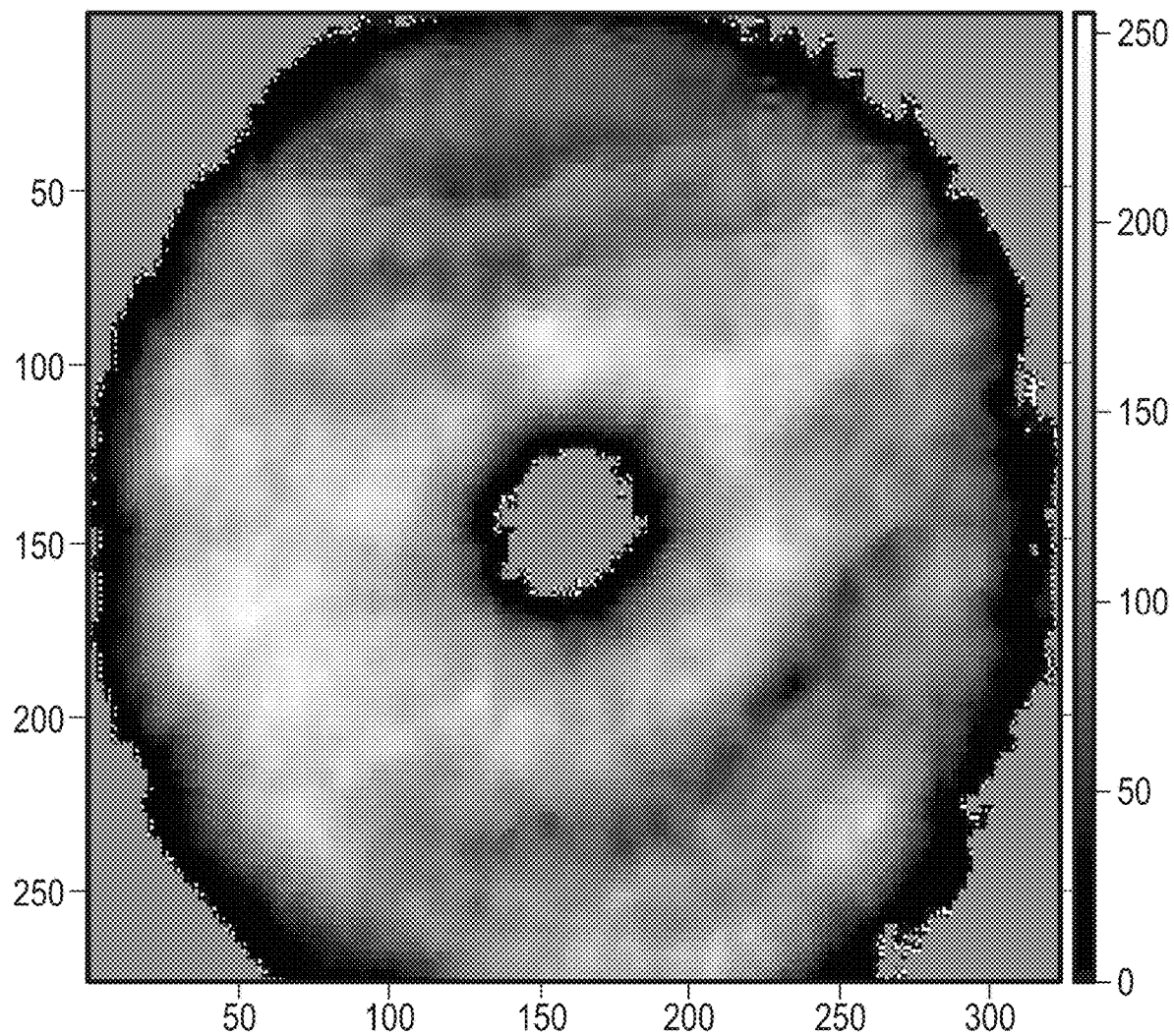
FIG. 4 includes an ultrasound image of a conventional abrasive article.

FIG. 4 includes an ultrasound image of Sample C1 used to evaluate the Homogeneity Factor. FIG. 5 includes a normalized probability plot for Samples S1 and C1 as analyzed by ultrasound for evaluation of the Homogeneity Factor. Sample S1 has a Homogeneity Factor of 62 and Sample C1 has a Homogeneity Factor of 86.

Example 3

Samples S2 and C2 were formed including the same components as the components of Sample S1. All the components were mixed in the same manner as described in Example 1. The gels for Samples S2 and C2 were poured into a mold. Only the gel of Sample S2 was de-aired to remove bubbles during molding. The green bodies were fired at the same condition as described in Example 1.

Figure 6A:
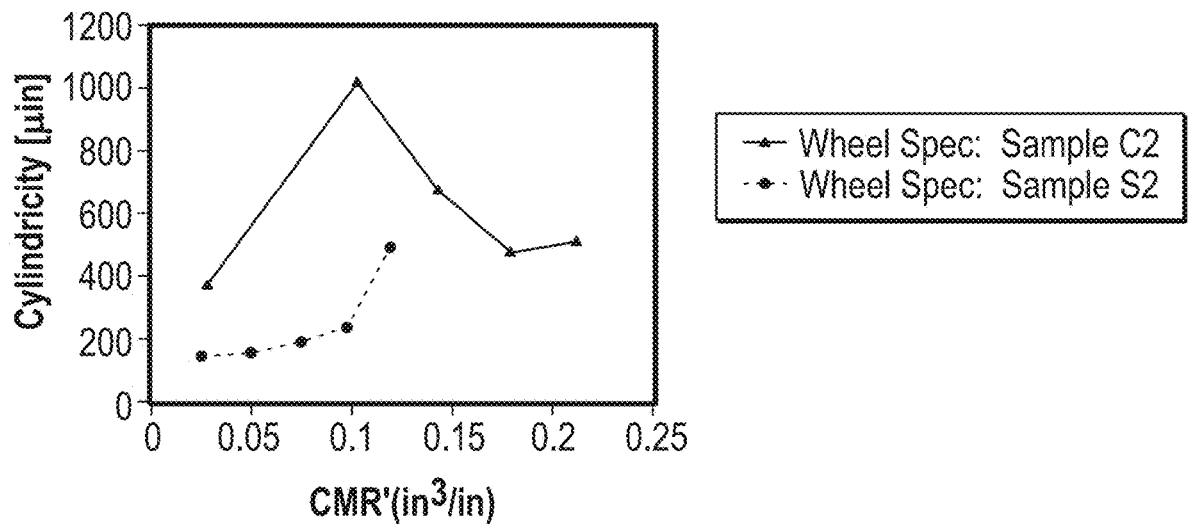
FIG. 6A includes a plot illustrating cylindricity vs. CMR' of Samples S2 and C2.
Figure 6B:
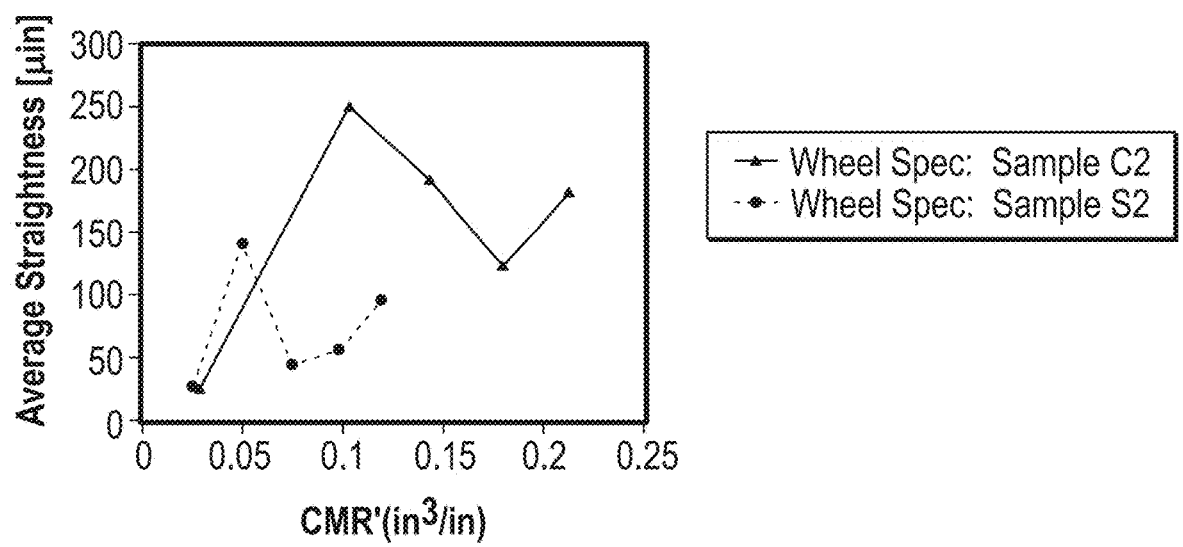
FIG. 6B includes a plot illustrating average straightness vs. CMR' of Samples S2 and C2.

Samples S2 and C2 were tested at the same shear rate for 3-dimensional tolerance and taper tolerance. FIGS. 6A and 6B include plots of cylindricity vs. CMR' and average straightness vs. CMR', respectively. Sample S2 demonstrated improved cylindricity and hence improved 3-dimensional tolerance compared to C2 at the same testing condition. Sample S2 also had improved average straightness (also referred to as taper tolerance), as illustrated in FIG. 6B, compared to Sample C2.

Example 4

Sample S3 is formed having a diameter of at least 260 mm, thickness of at least 2 mm, and a Homogeneity Factor not greater than 85, in the same manner as described in Example 1. Sample S3 is expected to perform with improved consistency when tested on grinding at least 5 to 10 workpieces using the same cartridge of a grinding tool and to provide improved surface finish on workpieces using a new cartridge for each workpiece, compared to a conventionally formed abrasive article tested under the same condition.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present)

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of making an abrasive article comprising:
   forming a mixture comprising abrasive particles, a bond precursor material including an inorganic material and a gelling agent, wherein the gelling agent is selected from the group consisting of agar, agarose, xanthan gum, carboxy methyl cellulose, gellan gum, carrageenan gum, guar gum, tara gum, cellulose gum, locust bean gum, or any combination thereof, and wherein the abrasive particles have an average particle size of at least 40 microns;
   adding a cationic agent to the mixture and forming a gel, wherein the cationic agent comprises an inorganic material that cross-links with the gelling agent, and wherein adding the cationic agent initiates crosslinking and formation of the gel;
   forming a green body from the gel; and
   forming a bonded abrasive body from the green body.

2. The method of claim 1, wherein the cationic agent comprises a cation selected from the group consisting of sodium, potassium, lithium, ammonium, copper, magnesium, iron, calcium, or any combination thereof.

3. The method of claim 1, wherein the mixture includes at least 0.1 wt % and not greater than 6 wt % of the cationic agent for a total weight of the mixture.

4. The method of claim 1, wherein the inorganic material that cross-links with the gelling agent comprises a salt.

5. The method of claim 1, wherein the mixture includes at least 0.1 wt % of the gelling agent for a total weight of the mixture.

6. The method of claim 1, wherein the abrasive particles comprise a material selected from the group consisting of oxides, borides, nitrides, carbides, oxynitrides, oxycarbides, amorphous, monocrystalline, polycrystalline, superabrasive or any combination thereof.

7. The method of claim 1, wherein the mixture includes for a total weight of the mixture, at least 20 wt % and not greater than 80 wt % of the abrasive particles, and a content of the bond precursor material of at least 1 wt % and not greater than 30 wt %.

8. The method of claim 1, wherein forming the mixture further includes adding a carrier comprising water.

9. The method of claim 1, wherein forming the mixture includes adding a dispersant to the mixture, wherein the dispersant is selected from the group consisting of sodium polyacrylate, copolymer with pigment affinic group, ammonium polymeta acrylate, ammonium polyacrylate, polyacrylic acid, ammonium salt in an acrylic polymer in water, citric acid, sodium dodecylbenzenesulfonate, and cetyltrimethyl ammonium bromide.

10. A method of making an abrasive article comprising:
forming a mixture comprising abrasive particles, a bond precursor material including an inorganic material and a gelling agent, wherein the gelling agent is selected from the group consisting of agar, agarose, xantham gum, carboxy methyl cellulose, gellan gum, carrageen gum, guar gum, tara gum, cellulose gum, locust bean gum, or any combination thereof;
adding a cationic agent to the mixture and forming a gel, wherein the cationic agent comprises an inorganic material that cross-links with the gelling agent, and wherein adding the cationic agent initiates crosslinking and formation of the gel;
forming a green body from the gel; and
forming a bonded abrasive body from the green body,
wherein the method further comprises heating the mixture to a gelling temperature to form the gel.

11. The method of claim 10, wherein the mixture is mixed while heating the mixture to the gelling temperature.

12. The method of claim 10, wherein the abrasive particles have an average particle size of at least 40 microns.

13. The method of claim 12, wherein the bonded abrasive body comprises a diameter of at least 127 mm, a thickness of at least 2 mm, a volume of at least 100 cm$^3$, or any combination thereof.

14. The method of claim 13, wherein the abrasive particles have an average particle size of at least 100 microns.

15. A method of making an abrasive article comprising:
forming a mixture comprising abrasive particles, a bond precursor material and a gelling agent comprising an organic material, wherein the abrasive particles comprises an average particle size of at least 65 microns;
forming a bonded abrasive body from the mixture, wherein the bonded abrasive body comprises a bond material comprising an inorganic material,
wherein forming the mixture further includes adding a cationic agent to the mixture to form a gel, wherein the cationic agent comprises a salt that cross-links with the gelling agent.

16. The method of claim 15, further comprising forming the gel by heating the mixture to a gelling temperature of at least 50° C. and not greater than 100° C.

17. The method of claim 15, wherein the gelling agent is selected from the group consisting of agar, agarose, xanthan gum, carboxy methyl cellulose, gellan gum, carrageenan gum, guar gum, tara gum, cellulose gum, locust bean gum, or any combination thereof.

18. The method of claim 17, wherein the cationic agent includes one or more of sulfates, chlorides, chromates, nitrates, carbonates, or hydrates.

19. The method of claim 18, wherein the bonded abrasive body comprises a diameter of at least 127 mm, a thickness of at least 2 mm, a volume of at least 100 cm$^3$, or any combination thereof.

20. The method of claim 10, wherein forming the mixture comprises adding a surfactant to the mixture, wherein the surfactant includes sodium lauroyl sarcosinate, sodium laurel sulfate, sodium laurate, sodium stearate, sodium alkyl sulfate, sodium dodecyl sulfate, sorbitan, polyethylene glycol, polysorbate, glycerol monosterate, egg lecithin, any combination thereof, wherein forming the mixture comprises adding a cationic agent including an inorganic material.

* * * * *